(12) United States Patent
Garton et al.

(10) Patent No.: US 7,195,284 B2
(45) Date of Patent: Mar. 27, 2007

(54) FLEXIBLE SYNTHETIC RESIN COUPLING

(75) Inventors: Darwin Garton, Lincoln, NE (US); Darrell Oltman, Lincoln, NE (US)

(73) Assignee: Snyder Industries, Inc., Lincoln, NE (US)

( * ) Notice: Subject to any disclaimer, the term of this patent is extended or adjusted under 35 U.S.C. 154(b) by 0 days.

(21) Appl. No.: 10/893,851

(22) Filed: Jul. 19, 2004

(65) Prior Publication Data

US 2006/0012174 A1   Jan. 19, 2006

(51) Int. Cl.
*F16L 27/10*   (2006.01)
(52) U.S. Cl. ...................... 285/223; 285/423
(58) Field of Classification Search ............ 285/144.1, 285/148.1, 148.3, 148.5, 148.8, 223, 226, 285/260, 298, 148.28, 423; 138/118, 109, 138/120, 155, DIG. 11
See application file for complete search history.

(56) References Cited

U.S. PATENT DOCUMENTS

| | | | |
|---|---|---|---|
| 2,068,876 A | | 1/1937 | Snyder |
| 2,640,502 A | * | 6/1953 | Powers ...................... 285/114 |
| 4,294,475 A | | 10/1981 | Kanai et al. |
| 4,522,433 A | | 6/1985 | Valentine et al. |
| 4,807,370 A | * | 2/1989 | Trimble ....................... 33/529 |
| 5,058,934 A | | 10/1991 | Brannon |
| 5,082,028 A | * | 1/1992 | Leonard ..................... 138/118 |
| 5,098,221 A | | 3/1992 | Osborne |
| 5,165,732 A | | 11/1992 | Townsend |
| 5,195,784 A | | 3/1993 | Richter |
| 5,310,080 A | * | 5/1994 | Figge, Sr. ................... 220/563 |
| 5,803,506 A | | 9/1998 | Argersinger et al. |
| 6,021,818 A | * | 2/2000 | Horst et al. ................. 138/172 |
| 6,299,217 B1 | | 10/2001 | Saito et al. |
| 6,308,753 B1 | | 10/2001 | Nimberger et al. |
| 6,422,610 B1 | | 7/2002 | Chang |

* cited by examiner

*Primary Examiner*—Aaron Dunwoody
(74) *Attorney, Agent, or Firm*—Hovey Williams LLP

(57) ABSTRACT

A flexible synthetic resin coupling is provided which is substantially self-sustaining in an initial configuration but provides sufficient resiliency and flexibility to absorb substantial loading, thereby accommodating relative movement between pipes and/or tanks to which it is connected. The coupling includes a conduit having two ends with a coupling positioned at at least one of the ends. The conduit is configured to have a total curvature of at least 270°, and may be configured to have a central axis of the flowpath defined by the passage within the conduit lie in a serpentine configuration in a single plane or alternatively to loop and lie in more than one plane.

1 Claim, 5 Drawing Sheets

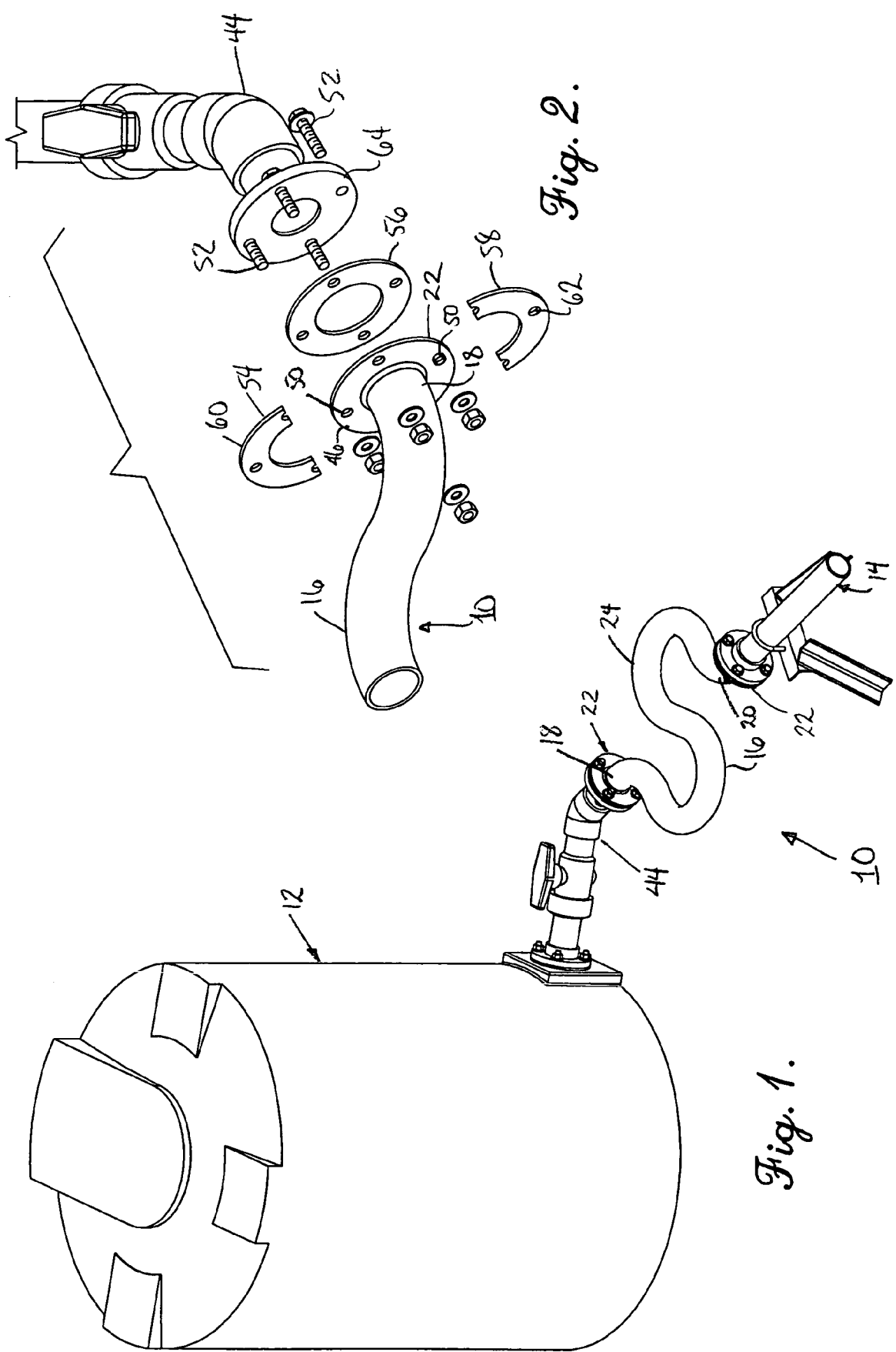

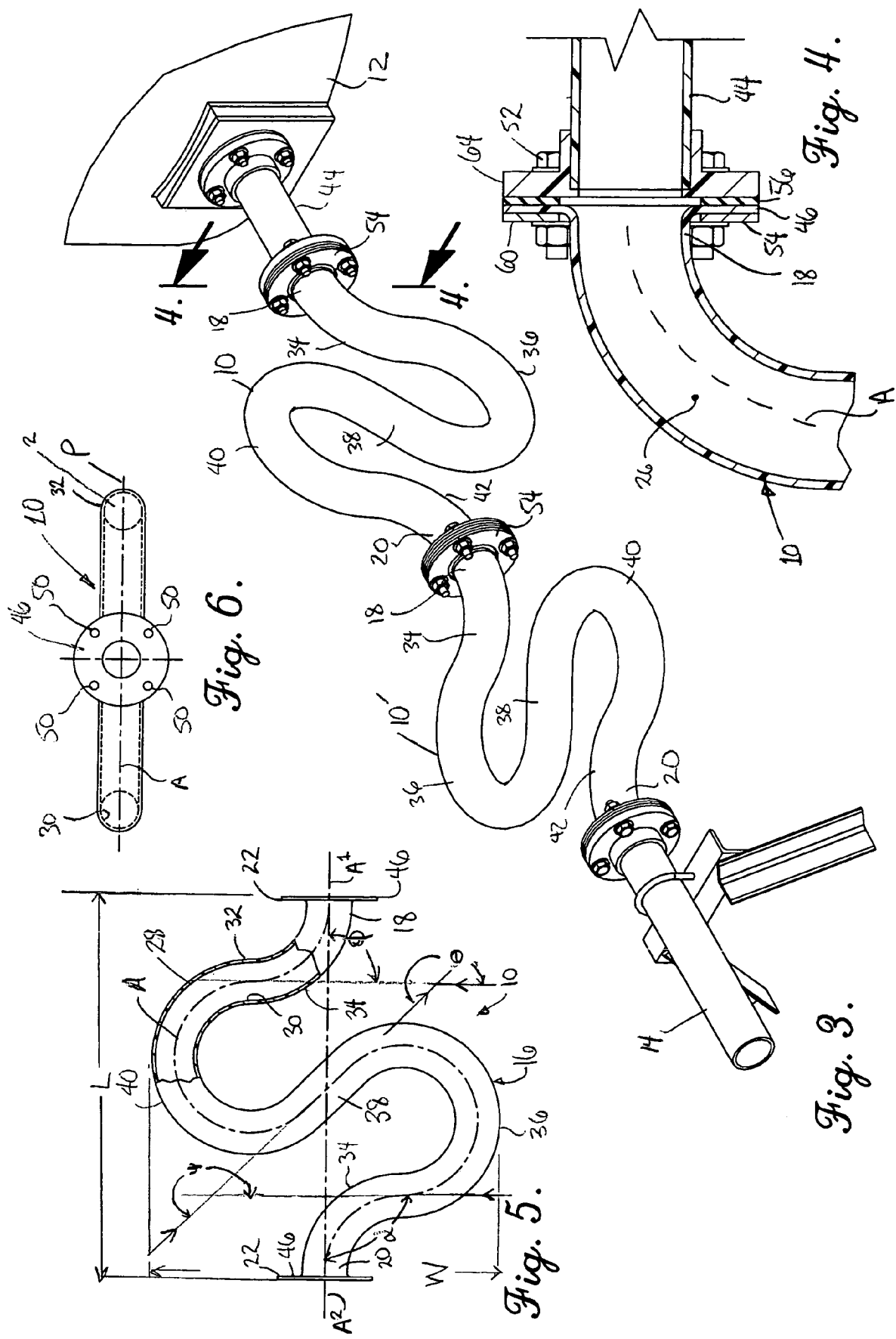

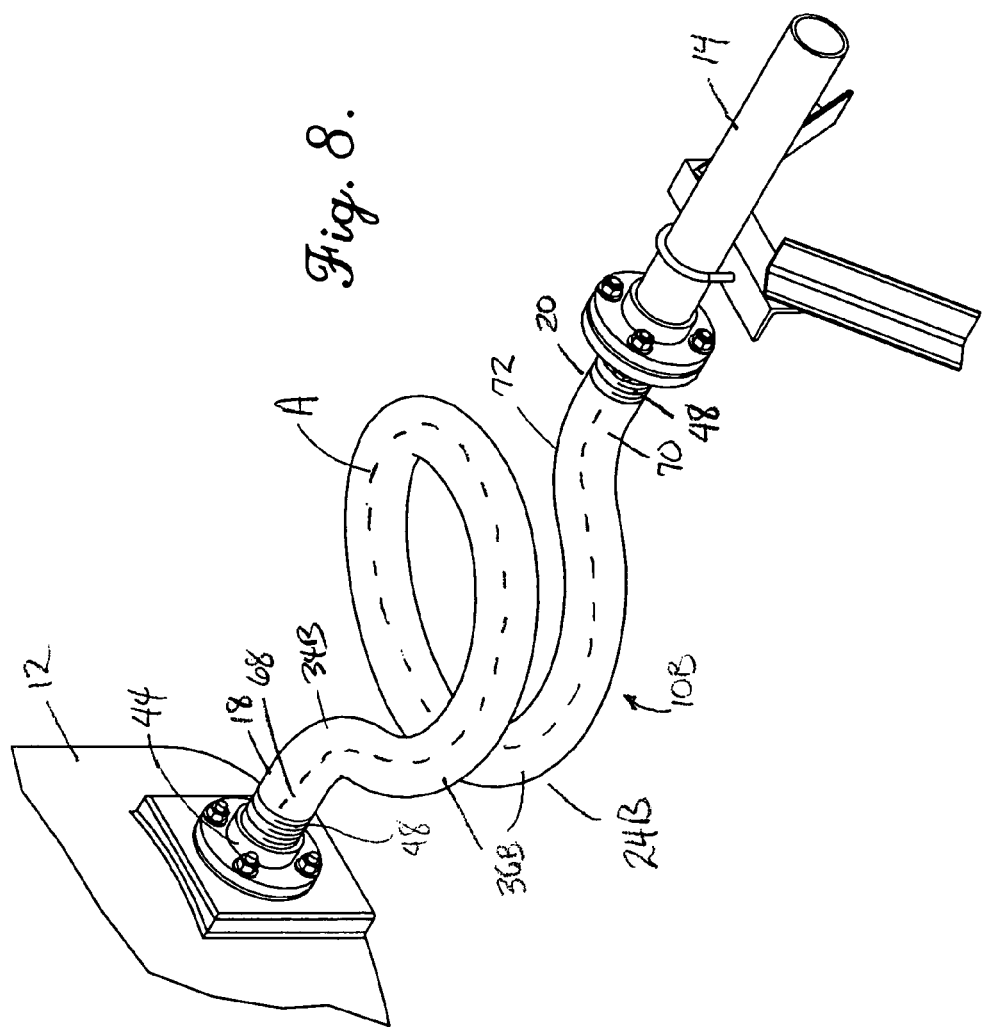
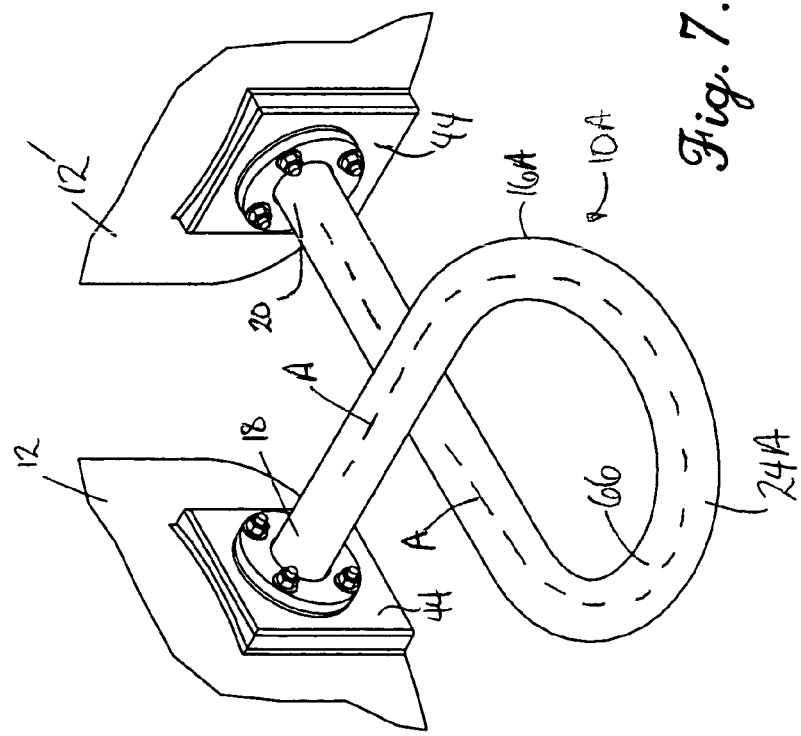

FLEXIBLE SYNTHETIC RESIN COUPLING

BACKGROUND OF THE INVENTION

1. Field of the Invention

This invention broadly concerns flexible synthetic resin couplings used to convey fluids from a source to a receiver. More particularly, it concerns a synthetic resin fluid coupling which is of a self-sustaining initial shape having a number of arcuate bends and is flexible in order to compensate for relative movement between the source and the receiver.

2. Description of the Prior Art

It is well known to employ piping to convey fluids from a source, such as a reservoir or pipe, to a receiver which may also be a reservoir or pipe. Such piping is often rigid and stiff, and this may be beneficial in some instances where the pipe must be supported and routed along a particular path. However, when the source and the receiver are subject to relative movement, as may occur because of thermal expansion and contraction or seismic events, to give just two of many examples, then a rigid pipe often imparts a force on the source or receiver which may cause fatigue or even failure. In the case of a receiver which is a tank or other reservoir, and the receiver is also a tank or other reservoir, each having walls with which the pipe is directly or indirectly connected, the pipe may impart significant force and stress against the wall due to its rigidity and stiffness. In addition, metal piping may be unsatisfactory in many applications not only for its rigidity and the transfer of loading to tank walls, but also because of differences in thermal expansion with the reservoir or other piping and the fact that it may deteriorate or fail when exposed to corrosive chemicals.

It is also known to utilize flexible conduit such as a rubber hose or the like to transport fluids. Such hoses do not, however, have a self-sustaining shape which permits the piping to be routed along a definite path and hold that configuration. Moreover, hoses do not have the degree of structural strength necessary in an industrial environment where impact or abrasion can be expected.

Thus, there has developed a need for an improved flexible conduit which is self-sustaining in an initial configuration, yields to impacts both internal and external, and reduces the transfer of forces to another pipe or reservoir to which it is connected.

SUMMARY OF THE INVENTION

These and other objects have been largely achieved by the flexible synthetic resin conduit of the present invention. As will be appreciated by those skilled in the art, the flexible synthetic resin conduit is designed to reduce load transfers, be self-sustaining in its initial configuration but flexible to permit the conduit to absorb internal fluidic hammers or external impacts, and be compatible in terms of thermal expansion and corrosivity resistance with most conventional synthetic resin tanks.

Broadly speaking, the synthetic resin conduit of the present invention includes two ends and an intermediate section, with a coupler provided at at least one end of the conduit. The intermediate section is configured to have a total curvature, that is an absolute value total of curvatures, of at least 270°. By including such curvatures, the conduit has an increased ability to flex during use yet return to its initial configuration after the applied force is removed. For example, instead of a conventional 90° elbow, the conduit of the present invention employs additional material so that the total amount of bending is 270° to provide greater flexibility than a 90° elbow but couple to other pipes or reservoirs in the same position as if a 90° elbow was used. The conduit is self-sustaining in its initial shape but flexible, meaning that when supported at one end, the conduit substantially maintains its initial, desired shape, but yields to internal or external forces by permitted bending in the intermediate section. Being provided of synthetic resin, the conduit is readily molded making it an elegant, inexpensive solution to the need for strength, thermal and chemical compatibility with a synthetic resin tank or conduit.

More preferably, the synthetic resin coupling is molded to include couplers such as flanges, threading, or the like at both ends to facilitate connection to reservoirs and other sections of conduit. The conduit portion of the coupling may be molded in a variety of different configurations, such as serpentine or a complete 360° turn. Thus, the arcuate configuration of the intermediate section is capable of absorbing substantially greater forces than a straight pipe section. Two or more conduits may be coupled together to provide flexibility along two different axis, or the conduit may be designed with bending not only in a single plane, but in planes angled relative to one another. In this way, the conduit may provide flexibility not only in an axial direction or a direction in a single plane, but in three orthogonal axes.

Most preferably, the coupling is initially molded of a high density polyethylene resin which provides sufficient structural strength to keep the conduit in an initial self-sustaining orientation but provide sufficient flexibility to move in response to external or internal loading. The use of high density polyethylene resin also provides chemical and thermal expansion compatibility with many synthetic resin reservoirs and pipes and the chemicals conventionally carried therein. Advantageously, the use of synthetic resin in the conduit permits the molding of the coupling as a continuous, unitary member which includes the conduit and coupler(s) and thereby avoids the necessity of welding or the like to assemble the coupling, and thus improves leak resistance and continuity along the conduit. This further permits the conduit to have a substantially constant cross-sectional dimension along its length to promote a smooth and uninhibited flow, such as a laminar flow, notwithstanding the curvature of the conduit.

These and other objects will be readily appreciated by those skilled in the art with reference to the detailed description and the drawings which are a part hereof.

BRIEF DESCRIPTION OF THE DRAWINGS

FIG. 1 is a perspective view of a first embodiment of the flexible synthetic resin coupling of the present invention, showing a first end of the coupling having a coupler connected to a reservoir outlet and a second end having a coupler connected to a pipe, and an intermediate section of the conduit portion of the coupling configured to present forward and reverse bends in a serpentine configuration;

FIG. 2 is an enlarged, fragmentary exploded view of the coupling and reservoir outlet of FIG. 1, showing the coupler at the first end and the attachment fittings for connection to the discharge outlet;

FIG. 3 is an perspective view of two of the flexible synthetic resin couplings shown in FIG. 1 connected together in 90° angular orientation to one another, with a first of the couplings shown connected to a reservoir outlet and a second of the couplings shown connected to a pipe;

FIG. 4 is a fragmentary vertical cross-sectional view taken along line 4—4 of FIG. 3, showing the interior of the coupling and the connection of the coupler at the first end to a discharge outlet flange;

FIG. 5 is a top plan view of the flexible synthetic resin coupling of FIG. 1 with portions broken away to show the interior of the coupling and the central axis of the coupling's interior shown in broken lines;

FIG. 6 is an end view of the flexible synthetic resin coupling of FIG. 5, with broken lines showing the interior of the wall of the conduit of the coupling and the substantial planar orientation of the coupling;

FIG. 7 is a perspective view of a second embodiment of the flexible synthetic resin coupling of the present invention connecting two reservoirs having fluid ports oriented at 90° angles to one another and showing the intermediate section between the first end and the second end having a continuous forward curvature of about 270°; and FIG. 8 is perspective view of a third embodiment of the flexible synthetic resin coupling of the present invention wherein the central axis of the intermediate section of the conduit between the first and second ends is not in a single plane and the first and second ends have the axis of the passage therein oriented in axial alignment;

DESCRIPTION OF THE PREFERRED EMBODIMENT

Figure 9:
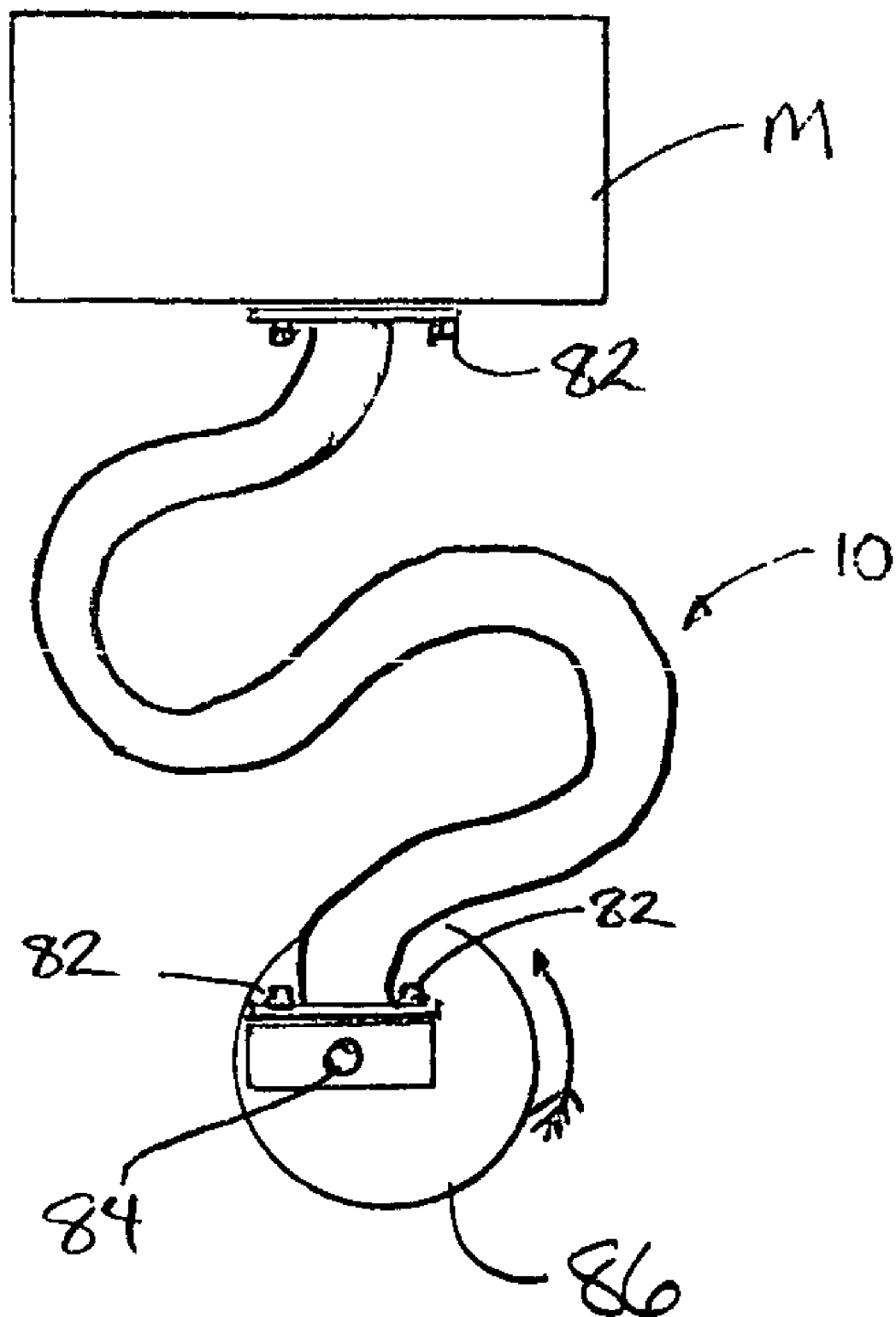
FIG. 9 is a schematic view of a test apparatus for testing the flexing of the coupling hereof.

Referring now to the drawings, a flexible synthetic resin coupling 10 is provided which is adapted for connection to a reservoir 12 and/or a pipe 14 for the transfer of fluids therethrough. The coupling 10 broadly includes a conduit 16 having first end 18 and second end 20. A coupler 22 is provided at each end 18 and 20 for facilitating connection of the coupling 10 to reservoirs, pipes or other fittings. The coupling 10 includes at least one intermediate section 24 between the ends 18 and 20 which has a total curvature of at least 270°. As used herein, "total curvature" is understood to mean the sum of all curvature of the intermediate section 24 without regard to the direction of the curves in either a forward, reverse or other direction.

The coupling 10 is preferably molded into a single, unitary member from synthetic resin material, and is substantially self-sustaining in an initial configuration when supported both ends, and most preferably one end, at normal, ambient temperatures (e.g., about 23° C.) without the application of additional supports or forces other than gravity. High density polyethylene is a preferred material used in molding the coupling 10, having a suitable wall thickness for the application desired. In most instances for a typical coupling application where the conduit has a nominal 3 inch inside diameter passage 26 therethrough, the conduit 16 is provided with a wall 28 having a thickness between an inside surface 30 and an outside surface 32 of about 0.188 inch to 0.25 inch and is formed of a linear high density polyethylene having a density between about 0.88 to as much as 1.8 specific gravity, but more preferably in the range of 0.93 to 0.96 specific gravity suitable for rotationally molding the coupling. As shown in FIG. 5, the length L of the coupling 10 is shown as the total distance from the outside of the flanges measured from end to end along a central axis A, while a width W is measured in a direction transverse to the central axis.

The passage 26 is preferably circular in cross-section throughout its length and has a central axis A extending through its length, shown in broken lines in FIGS. 5 and 6. The conduit 16 is preferably smooth, continuous and uninterrupted along its length between the ends 18 and 20. The central axis A is curved in at least a part of the intermediate section 24 but may be straight and linear along other portions of the conduit 16. The central axis A at each end 18 and 20 may be in linear alignment, as shown in the embodiment illustrated in FIGS. 1 through 6 and 8, or the axis A at each end 18 and 20 may be relatively angled, for example at 90° as shown in FIG. 7.

In the embodiment of the coupling 10 shown in FIGS. 1 through 6, the intermediate section 24 is substantially continuously curved in a serpentine configuration. As used in this description for convenience of reference and ease of understanding, a "forward" bend is used merely as a bend in a first direction of curvature, while a "reverse" bend is used to indicate a bend in a second direction of curvature substantially opposite to the "forward" bend, rather than to indicate a general direction between the first and second ends of the coupling 10. Using the axis $A^1$ at the first end 18 as a reference, the intermediate section includes a first bend 34 which is in an initial, forwardly bent or curved direction of about 90° measured from the axis at the first end 18 through the last of the first bend 34. The central axis of the passage then travels through a reverse bend 36 of 180° or more (about 225° in the case of the conduit 16 illustrated in FIGS. 1–6) from the orientation of the central axis A at the transition between the forward bend 34 and the reverse bend 36 as seen in FIG. 5, whereby the passage 26 is oriented back toward the first end 18. A transition zone 38 of a substantially straight section of the conduit 16 is provided at substantially the middle of the length of the passage 26 to facilitate alignment of the ends 18 and 20 and to provide the desired radius for the bends of the intermediate section 24, but may be eliminated in different applications. Moving along the passage 26 from the first end 18 to the second end, a third bend 40 is provided in a forwardly bent or curved direction and having a curvature in the forward direction of over 180° (again, about 225° in the case of the conduit 16 illustrated in FIGS. 1–6) relative to the axis A at the end of the transition zone. A fourth bend 42 in a reverse direction having a curvature of about 90° is located between the third bend 40 and the second end 20 to position the axis $A^2$ at the second end 20 in the desired, linear alignment with axis $A^1$ at the first end 18. The total curvature of the bends is thus the sum of the absolute value of each of the bends, not taking into account their forward or reverse direction. Thus, in the embodiment of the conduit 16 shown in FIGS. 1–6, the sum of the bends would be about 90°+225°+225°+90°=630°.

As shown in FIGS. 2, 4, and 6, the coupling 10 may be readily connected to outlet fittings 44 of reservoirs 12 or to pipes 14 by the couplers 22. The couplers 22 may be flanges 46 as shown in FIGS. 1–7 or threads 48, such as those shown on the outside surface 32 of the first and second ends as shown in FIG. 8, as well as other types of couplings well known to those skilled in the art. With reference to the flanges 46, they are preferably integrally molded as a part of the coupling 10 as shown in FIG. 4, and are provided with a plurality of openings 50 preferably evenly circumferentially spaced around the flange 46 as illustrated in FIG. 2 for receiving bolts 52 or other fasteners therethrough. To help secure and seal the flanges against outlet fittings 44 or the flanges of other pipes, collars 54 and seals 56 may be used. The collars 54 may be provided as arcuate, semi-annular half-rings 58 and 60 of metal such as stainless steel which are provided with holes 62 positioned to align in registry with the openings 50, and the seals may be provided of synthetic rubber or the like and positioned between the flange 46 and a complimentary flange 64 of the outlet fitting 44 or pipe 14. The use of a multiplicity of evenly circumferentially spaced openings 50 in the flange 46 permits the coupling 10 to be rotated in various orientations. For example, one coupling 10 may be connected to another similar coupling 10' as shown in FIG. 3 in 90° rotational orientation to one another to provide greater flexibility along two different orthogonal planes. Thus, in the use of similar couplings 10 and 10' as shown in FIG. 3, the first coupling 10 is positioned to provide primary flexibility in a substantially vertical plane, while the second coupling 10' is positioned to provide primary flexibility in a substantially horizontal plane. Thus, two such interconnected couplings may compliment one another by providing flexibility in different primary planes and thereby alleviate strain in the couplings not in the primary plane. Of course, in this combination, each of the couplings also accommodate limited relative movement between the reservoir 12 and the pipe 14 along the axis therebetween.

As may be seen in FIGS. 5 and 6, the coupling 10 is configured to lie in substantially a single plane, in that the central axis A of the passage 26 lies in a single plane P as shown in FIG. 6. This configuration helps in regard to maintain not only the coupling 10 but also those additional pipes and fittings connected thereto at a single level for purposes of routing and supporting the pipes and fittings.

It may be appreciated that the coupling 10 hereof may be provided in a variety of different configurations and still provide the combination of an initial, self-sustaining configuration and the adaptability to flex under loading desired in different applications. FIG. 5 illustrates a coupling 10A used to fluidically connect two reservoirs 12 and 12' positioned with their outlet fittings 44 aligned with flow axes oriented at 90° relative to one another, or at different elevations. Like reference characters are used to refer to components found in the embodiment of FIGS. 1–6 In the coupling 10A, the conduit 16A includes an intermediate section 24A which includes a 270° forward bend 66 and as such, the central axis A of the passage 26 does not lie in a single plane but rather overlaps itself. It may be appreciated that flexibility to accommodate loading on the coupling 10A is provided by the additional material included in the wall of the conduit 16A relative to an ordinary 90° bend. Further, the 270° forward bend 66 not only accommodates relative movement between the two reservoirs (or pipes, if the coupling 10A is used with pipes or pipes and reservoirs instead of the reservoirs) in a substantially horizontal plane, but the bend 66 permits flexing and movement along a vertical axis as well because of the use of synthetic resin in the conduit 16A and the overlapping arrangement of the conduit 16A.

A third embodiment of the coupling 16B is illustrated in FIG. 8 which provides a conduit 16B with an alternate solution to providing a self-sustaining initial configuration of the conduit with the requisite flexibility. In the embodiment of the coupling 10B, the couplers 22 are threads 48 on the outside surface of the wall at each end 18 and 20 of the coupling 10B, although it may be appreciated that threads 48 could also be internal threads in desired applications. Straight sections 68 and 70 are provided adjacent each end 18 and 20 of the conduit 16B, which facilitates mounting and alignment of the coupling 16B. The intermediate section 24B includes a first forward bend 34B and then a continuous reverse bend 36B of over 360° such that the conduit 16B in the reverse bend 36B is overlapping and not in the same plane. A final forward bend 72 is positioned between the reverse bend 36B and the straight section 70 in order to position the axis of the passage at the straight section 70 (and thus the end 20B) in substantial linear alignment with the straight section 68 (and thus the end 18B). By this configuration, the coupling 10B accommodates relative movement between reservoirs and pipes to which the coupling 10B may be connected in a variety of directions. By virtue of the coil configuration of the intermediate section 24B, the coupling 16B may permit flexing and thus limited relative movement between the source and receiver to which it may be connected in three orthogonal axes. That is to say, the coupling 16B permits relative movement between the source and the receiver both toward and away from one another, relative side-to-side movement in a horizontal plane, and relative vertical movement in an upright plane, as well as relative twisting or angular movement of the axes at each end 18B and 20B.

As shown in the figures, the couplings 10, 10A and 10B are all of sufficient stiffness to be self-sustaining in an initial configuration. Thus, the conduit 16 between the couplers 22 does not droop to the ground when supported at the ends, and may be suspended above a supporting surface by the outlet fittings of the reservoir or by supports used under or adjacent to the ends of the conduit as shown in FIGS. 1, 3 and 8.

The couplings 10, 10A and 10B of the present invention may be manufactured by molding the synthetic resin material into the desired configuration, including the curvature and wall thickness. One technique suitable for such manufacturing is rotational molding, which, as well known to those skilled in the art, involves placing synthetic resin into a heated mold and then rotating the mold to distribute the resin along the mold surface, then cooling the mold sufficiently during such rotation until the coupling may be extracted from the mold and retain its shape. In use, the couplings hereof are substituted for conventional hoses or stiff sections of pipe and attached to pipes or reservoirs such as tanks by use of the attachment bolts and seals, or by threading onto threaded receiving members 74. As shown in FIG. 3, two or more couplings 10 can be connected in series to provide increased flexibility, and oriented in to lie in different planes by rotating one coupling relative to another prior to attachment as illustrated. It may be desirable to position the couplings 10 at particular locations of movement or stress, and thus couplings 10 may be alternated with straight sections of pipe as desired. Because couplings 10 and 10B, for example, have their ends 18 and 20 in substantial axial alignment, the couplings 10 and 10B may readily be substituted for existing straight sections of pipe without interfering with the piping layout or the location of the reservoirs within a facility. Similarly, the coupling 10A may be substituted for more rigid 90° elbows. The use of the couplings 10 is particularly advantageous when the piping or reservoirs used therewith are primarily also of synthetic resin, such as high density polyethylene, thereby providing greater chemical compatibility than would be the case with metal pipes.

Testing in connection with the couplings hereof are set forth below.

Rotation Testing

Four couplings 10 in the configuration of that shown in FIGS. 1, 2, 5 and 6 were initially rotationally molded, two of the couplings 10 being molded of 0.942 density high density hexene copolymer HDPE (ExxonMobil HD 8660

Rotational Molding HDPE) and two of the couplings being molded of a linear low density hexene copolyer LLDPE (ExxonMobil LLDPE LL 8460) having a density of 0.938. The couplings 10 had an inside diameter of about 2.1 inches, a total length of about 21.71 inches, a width of about 18.50 inches, and a wall thickness of the conduit of about 0.2 inches. A schematic representation of the test arrangement is shown in FIG. 9. Holes were drilled in the flanges to permit attachment to a plate 80 by bolts 82, the plate then being attached by a pivot 84 attached to an S.I.I. rotary table 86, with one end coupled to the rotary table and the other end fixed in place to a solid mount M. The one end coupled to the rotary table was permitted to pivot during rotation, so that the one end flexed but did not twist during the rotary test procedure. The S.I.I. rotary table was set to complete one revolution every 10 seconds, 6 revolutions per minute, or 360 revolutions per hour. The one end of the couplings 10 attached to the rotary table moved approximately 1 inch of total travel in both a vertical and horizontal direction (½ offset of the pivot point P relative to the axis of rotation of the table 86).

Rotation Test #1

In an initial test, the couplings 10 were attached to the S.I.I. rotary table and the solid mount in an initial upright, substantially vertical position where the couplings 10 were in the initial, unflexed and relaxed state. The direction of movement of the rotary table was such that the one ends coupled thereto moved 1 inch in both a vertical direction and a horizontal direction in substantially the same plane as the couplings 10. The ends 18 and 20 were sealed to allow for introduction of and pressurization of the internal air. An air admittance valve and a pressure gauge were installed onto the solid mount of each coupling and air was introduced through the valve until the internal air within the couplings 10 was pressurized to 40 p.s.i.g. The pressure of 40 p.s.i.g. was done to simulate a 20 p.s.i.g. operating head pressure plus a two to one safety factor. The test was initially operated for a period of 288 hours and approximately 103,680 revolutions of the S.I.I. rotary table. Pressure was maintained at 40 p.s.i.g throughout the test for two of the four couplings, but two of the couplings 10 experienced an air leak with a corresponding reduction of 4 p.s.i.g every 24 hours. As a result of monitoring and adjustment, air was added during the test to the leaking couplings 10 at least once every 24 hours whereby a minimum of 36 p.s.i.g was maintained in the two leaking couplings 10. At the conclusion of the test, a visual examination of the couplings revealed no visible signs of stress, deformation or other issues. In order for the coupling 10 to be considered acceptable for use in accordance with the present invention, it should demonstrate no degradation in performance or visible defects such as cracks after a minimum of 24 continuous hours under this Rotation Test #1, and more preferably at least 240 continuous hours of such testing.

Rotation Test #2

A second test was then conducted on the four test couplings commencing approximately 24 hours after the conclusion of the first test described above. The same test apparatus and procedures were employed, except that the solid mount for connecting to the other end of the couplings 10 was moved 4 inches off the initial unstressed centerline in the plane of the S-shaped couplings 10, thereby prestressing the couplings 10 between the mounting flange and the conduit portion. This was intended to represent a tank and pipe alignment mismatch of 4 inches. This test was run for a period of approximately 456 hours and approximately 164,160 revolutions of the S.I.I. rotary table. The minimum internal pressure maintained in the couplings was again 36 p.s.i.g. throughout the test and at the conclusion, the conduits were inspected visually and no visible changes were noted in either the appearance of the couplings 10 or their function. In order for the coupling 10 to be considered acceptable for use in accordance with the present invention, it should demonstrate no degradation in performance or visible defects such as cracks after a minimum of 24 continuous hours under this Rotation Test #2, and more preferably at least about 240 continuous hours of such testing.

Rotation Test #3

A third test was then conducted on the four test couplings commencing approximately 19 hours after the conclusion of the second test, again using the same test apparatus and procedures as in the first and second tests. In the third test, the solid mount for the other end of the couplings 10 was moved 4 inches transverse to the plane of the S-shaped couplings in addition to the 4 inch offset in the plane of the S-shaped couplings 10 of the second test. Thus, the couplings were prestressed in two perpendicular planes, simulating both a vertical and horizontal alignment offset of 4 inches between a pipe and a tank. This third test ran approximately 218 hours and approximately 95,040 revolutions of the S.I.I. rotary table. The minimum internal pressure maintained in the couplings was again 36 p.s.i.g. throughout the test and at the conclusion, the conduits were inspected visually. After disassembly of the couplings, no visible effects of all of the testing could be seen, except that the flanges were now angled relative to the conduit as a result of cold flow at the region of greatest stress. No signs of stress cracking or other issues which could result in failure. Cold flow of the resin in the couplings 10 was an expected development after extended movement and misalignment, but did not degrade the function of the couplings 10. In order for the coupling 10 to be considered acceptable for use in accordance with the present invention, it should demonstrate no degradation in performance or visible defects such as cracks after a minimum of 24 continuous hours under this Rotation Test #3, and more preferably at least about 200 continuous hours under such testing.

Rotation Test #4

A fourth test was initiated on the same four couplings as tested above approximately four months after the conclusion of the third test. The same test apparatus and procedures were employed as in the third test with offsets of approximately 4 inches in both the plane of the S-shaped couplings 10 and also transverse to the plane of the couplings. One difference in the test procedure was that all four of the couplings 10 were filled to approximately ½ full with a 10% igepal (nonionic surfactant) solution in order to attempt to effect premature failure of the couplings 10, but the couplings 10 were not pressurized. A second variation from the third test procedure was that the S.I.I. rotary table was placed into a rotational molding BMY oven and the temperature was maintained at approximately 104° F. The fourth test was conducted over a period of approximately 65 days with a total of approximately 544,320 revolutions of the S.I.I. rotary table during the course of the fourth test. No leakage or loss of solution was noted. After removal and visual inspection, no further deformation or any defects were noted in the couplings 10. In order for the coupling 10 to be considered acceptable for use in accordance with the present invention, it should demonstrate no degradation in performance or visible defects such as cracks after a minimum of 24 continuous hours under this Rotation Test #4, and more preferably at least about 200 continuous hours under such testing.

Rotation Test Summary

Thus, in the four tests described above, approximately 907,200 revolutions of the S.I.I. rotary table were conducted without any failures of the couplings 10.

Load Testing

Figure 10:
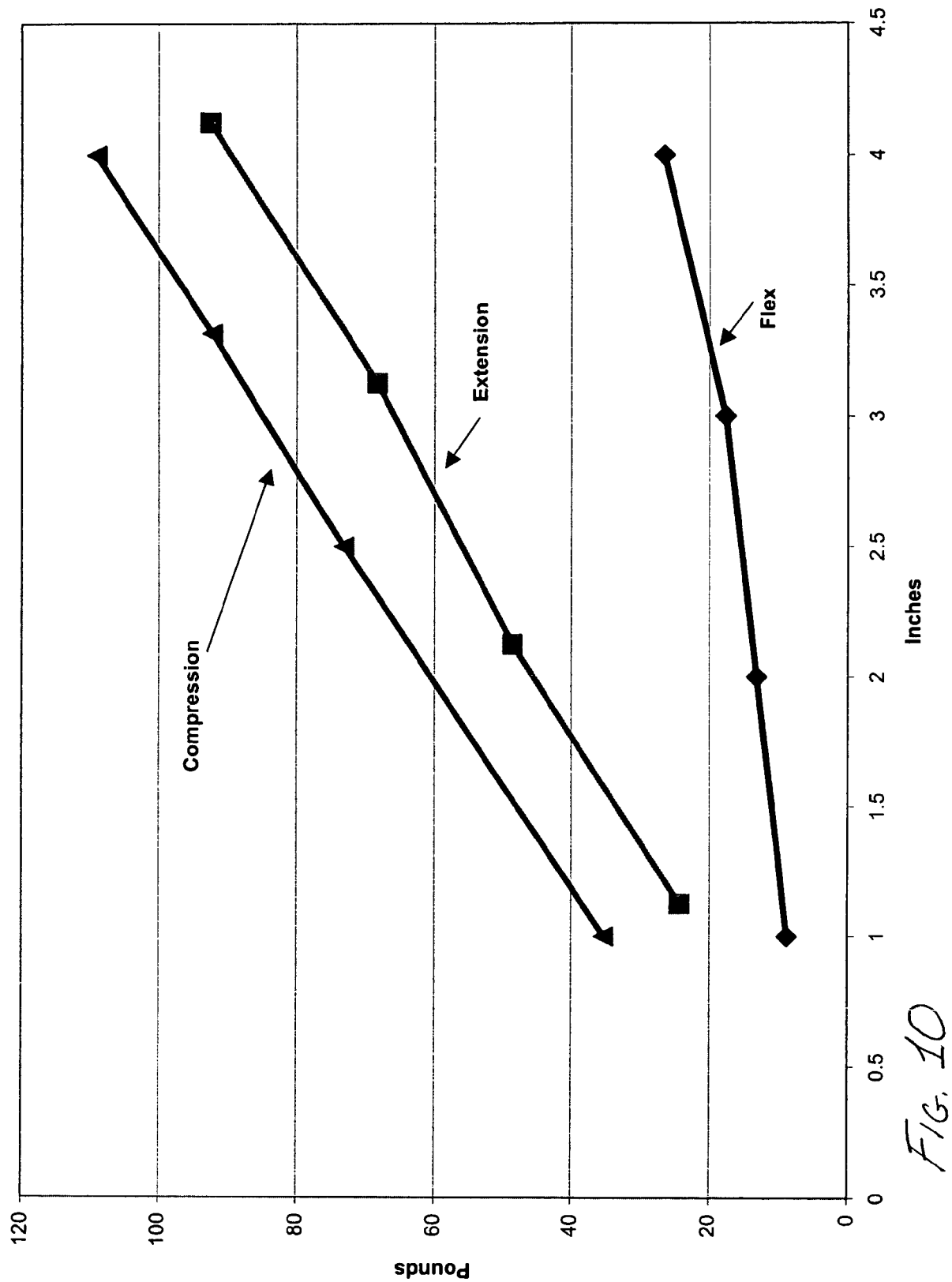
FIG. 10 is a graph showing the results of load testing of the coupling hereof.

Further load testing was conducted on an S-shaped coupling 10 configured as shown in FIGS. 1, 2, 5 and 6, where the coupling 10 had a 3 inch inside diameter, a total length from flange-to-flange of approximately 30.25 inches, a total width measured in the plane of the S-shaped coupling 10 of approximately 27.5 inches, and a wall thickness in the conduit of approximately ¼ inch. FIG. 10 is a graph illustrating the results of the load testing.

Load Test #1

In a first load test, the 3 inch inside diameter coupling was bolted to a steel table in a substantially vertical position with a height measured at 30.25 inches. Weight was added on top of the free end of the coupling 10. To achieve 1 inch of compression, a load of 35.2 pounds was placed on the free end; to achieve 2½ inches of compression, 73.2 pounds were placed on the free end; to achieve 3 5/16 inches, 92.2 pounds were placed on the free end; to achieve 4 inches of compression, 109.0 pounds were placed on the free end. Beneficially, this test revealed that the compression loading of the coupling 10 within this range leads substantially linear, and thus predictable, results.

Load Test #2

A second load test was performed on the 3 inch inside diameter coupling 10 of the first test. In this test, the coupling 10 remained in a substantially vertical orientation but a steel plate with a centered lifting eye was bolted to the flange of the uppermost, free end of the coupling 10. The lifting eye was hooked to a strain gauge which in turn was connected to a lifting hoist. In an initial, unloaded condition, the height of the coupling 10 in the vertical orientation was measured at 28 ⅞ inches. During extension or tension, a load of 24.25 pounds resulted in 1-⅛ inch extension; a load of 48.5 pounds resulted in 2-⅛ inch extension; a load of 68.3 pounds resulted in 3-⅛ inch extension, and a load of 92.5 pounds resulted in 4-⅛ inch extension. Again, the extension or tension load testing beneficially yielded substantially linear, and thus predictable, results over the test range.

Load Test #3

A third load test was then performed on the same 3 inch inside diameter coupling used in the first and second load tests. In this third load test, the coupling 10 was bolted to the steel table in a substantially horizontal orientation with the plane of the S-shaped coupling substantially horizontal. A steel plate with a centered lifting eye was then bolted to the flange of the remote, free end of the coupling, and was hooked to a strain gauge. An unloaded (other than the steel plate and lifting eye) measurement was taken with the free end of the coupling 10 positioned approximately 31 inches from the floor. An upward pulling force, transverse to the plane of the S-shaped coupling, was then applied to the strain gauge, wherein 8.81 pounds of force were required to produce 1 inch of movement from the original measurement; 13.2 pounds of force were required to produce 2 inches of movement from the original measurement; 17.63 pounds of force were required to produce 3 inches of movement from the original measurement, and 26.45 pounds of force were required to produce 4 inches of movement from the original measurement. Again, the transverse flexion load testing beneficially yielded substantially linear, and thus predictable, results over the test range.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby states their intent to rely on the Doctrine of Equivalents to determine and assess the reasonably fair scope of their invention as pertains to any apparatus not materially departing from but outside the literal scope of the invention as set out in the following claims.

The invention claimed is:

1. The combination comprising:
 a flexible coupling for enabling the passage of fluid therethrough, consisting essentially of:
 a unitary conduit formed of synthetic resin material and having first and second ends and an intermediate section between the first and second ends, said conduit having an initial configuration and being substantially shape-retaining and resiliently biased to return to said initial configuration when compressed; and
 a coupling adjacent said first end,
 at least said intermediate section of said conduit being curved, with the total curvature of the intermediate section being at least about 270°,
 the entirety of said conduit and coupler lying essentially in a common plane and
 a source of fluid supply comprising an upright synthetic resin tank, said coupling operatively connected with said tank.

* * * * *